Jan. 24, 1939.  L. J. CAMPBELL  2,144,674
CLUTCH MECHANISM
Filed Sept. 29, 1937
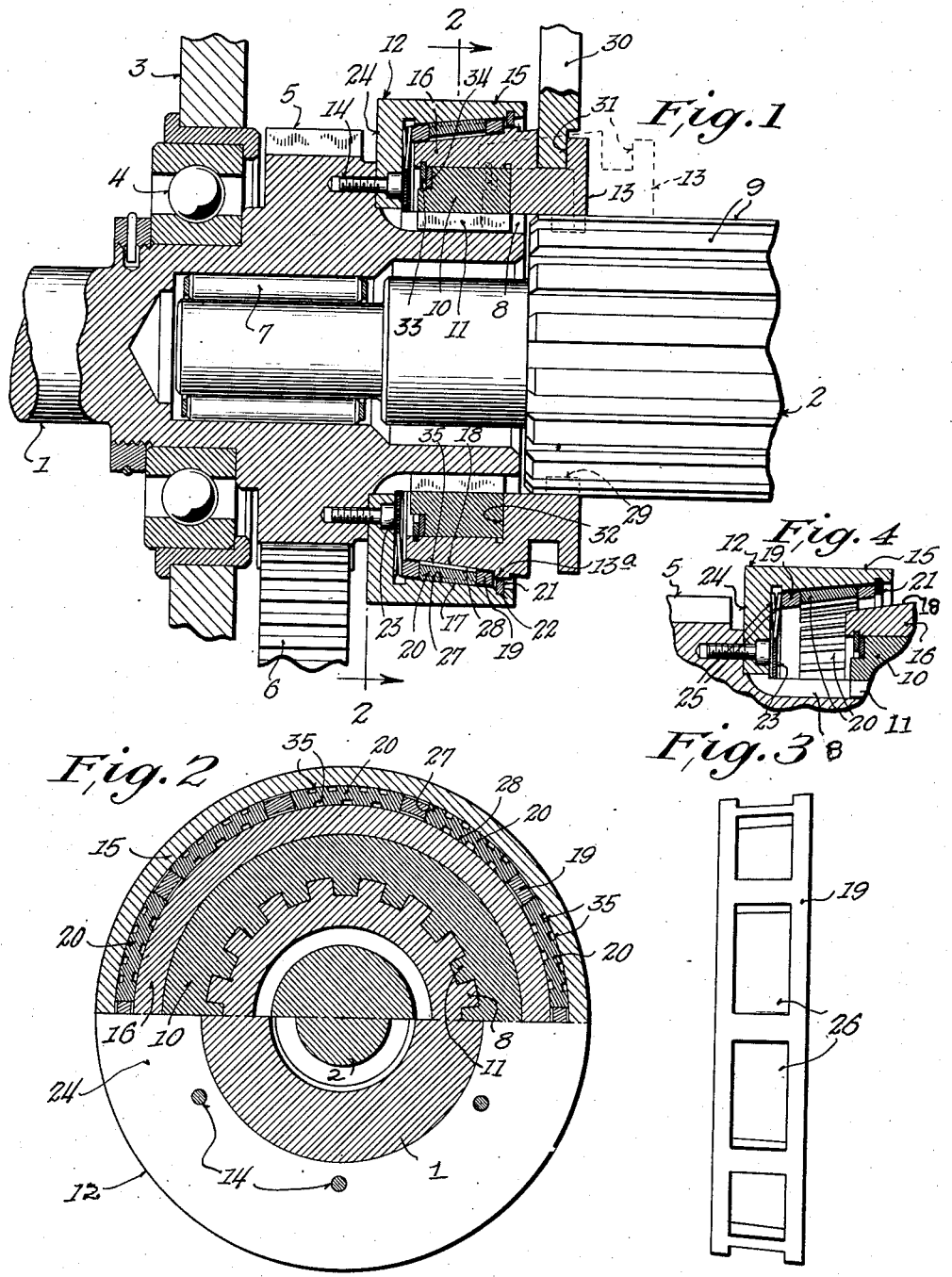
INVENTOR.
LEON J. CAMPBELL
BY
ATTORNEY.

Patented Jan. 24, 1939

2,144,674

UNITED STATES PATENT OFFICE 2,144,674

CLUTCH MECHANISM

Leon J. Campbell, Chicago, Ill., assignor to Campbell-Buchanan Corporation, Chicago, Ill., a corporation of Illinois Application September 29, 1937, Serial No. 166,260

27 Claims. (Cl. 192—53)

This invention relates to clutch mechanisms and more particularly to synchronizing clutches for automotive change speed transmissions.

These clutch assemblies comprise in general a frictional clutch unit and a positive clutch unit, the latter being employed to directly connect the elements with respect to which the clutch units are associated following their synchronization by the frictional clutch.

In accordance with my invention, the opposed annular inclined frictional clutch surfaces of the co-operating clutch members of the frictional clutch unit are disposed at different angles to the axis of rotation of the alined driving and driven elements which said clutch members selectively engage. One of these surfaces is at a greater or steeper angle or incline to said axis than the other clutch surface, thus enabling the surface of the lesser angle to be disposed within range most effective for securing a driving connection for the clutch members when the unit is engaged. On the other hand the clutch surface of the greater angle may be disposed within the range required to afford the requisite slippage in the unit to gradually pick up a load and a quick release so that the positive clutch unit may be engaged without loss of synchronism between the elements as established by the frictional clutch. This arrangement provides an effectively acting clutch construction and one which may be engaged and disengaged without noise, shock or jar.

In order that the frictional clutch surfaces which are arranged at different angles may function in the operation of the frictional clutch unit for establishing a driving connection, I provide means between said surfaces of a character to frictionally engage them, said means also having surfaces, complementary to the clutch surfaces of the frictional clutch units.

The means referred to may take any suitable form, an arrangement of clutch blocks being provided in the instant disclosure. These blocks, in accordance with my invention, are supported between the opposed frictional clutch surfaces referred to by a suitable carrier which may be in the form of a ring having openings to accommodate the blocks. The blocks are tightened between the frictional clutch surfaces mentioned on closing the frictional clutch unit the members of which may be relatively shiftable with respect to each other as will hereinafter appear.

The invention consists further in the features hereinafter described and claimed.

In the accompanying drawing—

Fig. 1 is a longitudinal sectional view, with parts in elevation, of a synchronizing clutch device of my invention in an automotive change speed transmission;

Fig. 2 is a transverse sectional view taken on the indirect line 2—2 of Fig. 1;

Fig. 3 is an elevational view of the carrier element to be hereinafter described; and Fig. 4 is a fragmentary sectional view showing a detail as to the spring disc to be later described.

In the drawing, 1, 2 indicate the alined driving and driven shafts of an automotive change speed transmission assembly. The shaft 1 leads from the master clutch (not shown) of the vehicle and extends into the transmission case through its front wall 3, being journaled in said wall in an anti-friction bearing 4, as shown.

A gear 5 is integral with or otherwise rigidly fixed to the shaft 1 within the transmission case and said gear is in constant mesh with a gear 6 on a lay shaft (not shown) as in devices of this general character. The lay shaft is journaled below the alined driving and driven shafts 1, 2 and provides a support for the other lay shaft gears (not shown) spooled to each other and to the gear 6 for rotation in unison. The lay shaft gears are for the second, third, and reverse speeds, respectively, of the transmission. The portion of the shaft 1 at the gear 5 is made hollow and is fitted with a roller bearing 7 to receive and support the adjacent reduced end of the shaft 2, as shown.

The inner portion of the shaft 1 beyond the gear 5 is splined, as at 8, 8. The adjacent portion of the shaft 2 is also splined, as at 9, 9. The splined portions of the two shafts have the same diameter and the splines 8, 9 on the two shafts are similar, so that when the shafts are synchronized, the clutch member 10 of the positive clutch may be slid part way onto the shaft 2 for positively connecting the two shafts for a high speed or direct connection between them.

The clutch member 10 is in the form of a sleeve surrounding the shaft 1 and is provided with internal teeth 11 to engage the splines 8, 9 on the two shafts. Normally, the clutch member 10 is supported by the shaft 1, at which time the shafts may be wholly disconnected, or may be connected for synchronization by the frictional clutch unit to be presently described. When the two shafts are connected for direct drive, the sleeve 10 is slid partially onto the shaft 2, thereby bridging the joint between the two shafts and engaging the splines of both of them as indicated in dotted lines in Fig. 1.

The frictional clutch unit comprises two cooperating cone clutch members 12, 13 on the shafts 1 and 2, respectively. The member 12 is rigidly fixed to the gear 5 as by screws 14, and has a laterally extending annular portion 15 surrounding the co-operating part 16 of the clutch member 13. In accordance with my invention, the opposed annular surfaces 17, 18 of the clutch parts 15 and 16 are inclined to the axis of rotation of the shafts 1, 2 at different angles, the angularity of the surface 17 being of a lesser degree than that of the surface 18. In the embodiment shown, the surface 17 is at an angle of approximately 5° to the axis referred to, while the surface 18 is at an angle of approximately 7° to said axis. This provides the clutch member 13 with a steeper taper or incline than the clutch member 12 for the purpose to presently appear. These tapers are disposed with their apices on the same side of the clutch members 12, 13, as will be seen from Fig. 1.

Arranged between the tapers is a ring-like carrier 19 provided with a plurality of displaceable clutch blocks 20, 20 of the desired wear resistant metal. The carrier ring 19 is retained in place between the tapers by a split stop ring 21 at the outer edge of the carrier as shown. The stop ring 21 is carried by the clutch member 12 in a groove 22 in its inner surface 17. A spring disc 23 is fitted adjacent the inner side of the radial body portion 24 of the clutch member 12 and engages the inner edge of the carrier 19 to normally urge it in a direction toward the stop ring 21. In the embodiment shown, the spring disc 23 has its outer periphery formed with divergent fingers 25 to respectively engage against the inner edge of the carrier 19 and the opposed wall of the clutch body 12 as shown in Fig. 4. Any other form of spring means may be employed as desired to yieldingly urge the carrier 19 toward the stop 21. Also, the clutch member 12 may be riveted to the gear 5, if desired.

The diameter of the carrier 19 is such that it is out of contact at all times with the tapered surfaces 17, 18 of the clutch members 12 and 13 as shown in the drawing. The clutch blocks 20 are disposed in openings 26 in the carrier 19 and are forced by the clutch member 13 against the clutch member 12 when connecting the shafts 1, 2 through said members. The blocks 20 are circumferentially spaced about the carrier as indicated in Fig. 2, and have their outer surfaces 27 inclined complementary to the tapered surface 17 of the clutch member 12 and their inner surfaces 28 inclined complementary to the tapered surface 18 of the clutch member 13. The blocks 20 fit sufficiently loose in the openings 26 so that the blocks may be readily and easily forced against the clutch member 12 without hinderance by the carrier 19. The blocks 20 are prevented from dropping out of the openings 26 by having a tapered or other interconnection between the carrier and the blocks.

The clutch member 13 is supported by the driven shaft 2, having internal teeth 29 in mesh with the splines 9 of said shaft as shown. The clutch member 13 is moved or shifted toward and from the clutch member 12 in engaging and disengaging the clutch members by a shifter yoke or equivalent element 30 engaging the clutch member 13 in an exterior groove 31 therein as shown. In an automotive change speed transmission, the element 30 is connected to one of the shift rods (not shown) of the transmission and is shifted back and forth by the usual hand shift lever, also not shown.

The portion 16 of the clutch member 13 surrounds the positive clutch element 10 as shown in Fig. 1. The portion 16 and the body of the clutch member 13 provide a chamber or recess 32 for the clutch element 10, the latter being rotatably retained in said recess by a split holding ring 33 and a co-operating wear ring 34.

The mechanism shown and described operates as follows. The shafts 1 and 2 are connected first through the frictional clutch unit and later through the positive clutch unit. It may be remarked here that the positive clutch unit comprises the member 10 and the co-operating splined portion of the shaft 2. The shafts are connected in the sequence stated in order that they may be synchronized by the frictional clutch before connection by the positive clutch. It is to be of course understood that the frictional clutch is released before the positive clutch is thrown in. With my invention, as will presently appear, the difference in angularity with respect to the clutch surfaces 17, 18 provides for a quick release of frictional clutch unit on being disengaged, and the positive clutch unit may be engaged without loss of synchronism as established between the shafts by the frictional clutch. Hence, the positive clutch connection may be made quickly and easily and without noise, shock or jar as the teeth 11 of the clutch element 10 are moved into the spaces between the splines 9 on the shaft 2. There is no grinding action between the two sets of teeth as the shafts are synchronized when one set of teeth are meshed with the other, it being understood that there is a full complement of teeth about the circumference of each clutch member.

The surface 18 of the greater angle or inclination provides for the quick release between the clutch members. This surface is not employed to afford the driving connection between the clutch members 12 and 13 and may therefore be given the steep angle necessary to provide for a quick release and also the slippage requirements for the clutch members to gradually and easily pick up a load as the clutch is engaged.

The surface 17 on the other hand provides the driving connection for the clutch members 12 and 13 and not being concerned with the quick release of the clutch or the slippage factors thereof may be given the lesser angle or inclination required to afford the most effective driving and grabbing connection for the clutch. Manifestly, the clutch of my invention is highly effective because the opposed annular clutch surfaces 17, 18 are confined to their respective duties as herein stated, and are not required to afford both a driving connection and the slippage factors for the clutch as in those clutch constructions wherein the opposed annular frictional clutch surfaces are complementary and directly engaged. I have found in practice for automotive change speed transmissions in particular, that a 5° angle for the surface 17 gives an effective driving connection, while a 7° angle for the surface 18 gives a quick release and the slippage necessary for the clutch. I do not wish to be limited to these particular angles, as my invention contemplates any differential angular arrangement as may be necessary for the particular clutch construction with respect to which my invention may be employed.

The connection between the clutch members 12 and 13 is of course effected through the clutch blocks 20. As the clutch unit is engaged on shifting the clutch member 13 toward the clutch member 12, the annular abutment or shoulder 13a on the shiftable clutch member 13 contacts the outer edge of the carrier-ring 19 before the member 13 acts on the blocks 20. This action centers the carrier and its blocks between the clutch surfaces 17 and 18 and the carrier is also picked up and rotated by the rotating clutch member. This throws the blocks into contact with the surface 17 of the lesser angle and a continued inward movement of the clutch member 13 engages its surface 18 with the blocks and forces them against the surface 17. The outer surfaces 27 of the blocks having the same taper as the surface 17 affords a driving connection between the clutch member 12 and the blocks before such connection is transmitted to the clutch member 13. Thus, slippage is afforded as the torque strains are overcome, and the driving connection afforded by the surface 17 of the lesser angle is transmitted to the clutch member 13 as the latter tightens the blocks against the surface 17.

The greater angle (surface 18) has the further advantage of providing a greater leverage for pressing the blocks 20 against the clutch member. 12. These blocks have grooves 35, 35 in their inner and outer surfaces to scrape or remove lubricant from the clutch surfaces 17, 18 and thus render them sufficiently "dry" for the frictional clutch to engage. These grooves extend axially of the shafts 1, 2 and are essential because the transmission mechanism runs in oil or grease and the clutch parts are made of metal providing a metal to metal contact between them.

While the positive clutch element 10 is shifted into clutching engagement with the shaft 2 on the reverse movement of the frictional clutch member 13, it is to be understood that my invention may be equally as well adapted to an arrangement wherein the positive connect'on is made by shifting the element 10 otherwise or in the same direction in which the member 13 is moved to engage the frictional clutch.

In the particular embodiment shown, the parts occupy the positions shown in full lines in Fig. 1 when the frictional clutch is engaged. The parts have the same relative positions when the clutch assembly is neutral, the blocks 20 being out of driving engagement with the clutch surface 17. The extent to which the clutch element 10 is shifted to positively connect the two shafts is shown in dotted lines in Fig. 1 and in full lines in Fig. 4. It will be noted that the element 10 in this position is out of contact with clutch blocks 20. The frictional clutch is also disengaged at this time.

In a transmission assembly of the character described two clutch assemblies as depicted in Fig. 1 are employed. One assembly is for direct drive or high speed as shown in Fig. 1, and the other assembly is for the second or intermediate speed as shown in my Patent No. 1,984,354, granted December 8, 1934. Both clutch assemblies would be alike in construction and operation, except that the assembly at the intermediate speed would have its parts reversed, being arranged, however, with the fixed clutch member 12 on the driving element, and the shiftable clutch member 13 on the driven element.

The details of construction and arrangement of parts shown and described may be variously changed and modified without departing from the spirit and scope of my invention, except as pointed out in the annexed claims.

I claim as my invention:

1. In a clutch mechanism, alined driving and driven elements, a frictional clutch unit for selectively connecting said elements, said unit comprising a pair of relatively shiftable co-operating clutch members on the respective elements, said clutch members having annular frictional clutch surfaces at different angles to the axis of rotation of the elements and disposed with their apices on the same side of the clutch members, means between and engageable with said clutch surfaces, said means being forced against the clutch surfaces by the clutch members in the relative shifting thereof toward each other to connect the clutch members and having clutch faces complementary to those of the clutch members, and shifting means for the clutch members.

2. In a clutch mechanism, alined driving and driven elements, a frictional clutch unit for selectively connecting said elements, said unit comprising a pair of relatively shiftable co-operating clutch members on the respective elements, said clutch members having annular frictional clutch surfaces at different angles to the axis of rotation of the elements and disposed with their apices on the same side of the clutch members, blocks between and engageable with said clutch surfaces, said blocks being forced against the clutch surfaces by the clutch members in the relative shifting thereof toward each other to connect the clutch members and having clutch faces complementary to those of the clutch members, means for holding the blocks between the clutch members, and shifting means for the clutch members.

3. In a clutch mechanism, alined driving and driven elements, a frictional clutch unit for selectively connecting said elements, said unit comprising a pair of co-operating clutch members on the respective elements, said clutch members having annular frictional clutch surfaces at different angles to the axis of rotation of the elements, blocks between and engageable with said clutch surfaces, said blocks being forced against the clutch surfaces when connecting the clutch members and having clutch faces complementary to those of the clutch members, and a carrier for holding the blocks between the clutch members and having openings therein to accommodate the blocks.

4. In a clutch mechanism, alined driving and driven elements, a frictional clutch unit for selectively connecting said elements, said unit comprising a pair of co-operating clutch members on the respective elements, said clutch members having annular frictional clutch surfaces at different angles to the axis of rotation of the elements, blocks between and engageable with said clutch surfaces, said blocks being forced against the clutch surfaces when connecting the clutch members and having clutch faces complementary to those of the clutch members, a carrier for holding the blocks between the clutch members and having openings to accommodate the blocks, and means providing an interfitting connection between the openings and the blocks to prevent the blocks dropping out of the openings when one of the clutch members is out of contact with the blocks.

5. In a clutch mechanism, alined driving and driven elements, a frictional clutch unit for selectively connecting said elements, said unit comprising a pair of relatively shiftable clutch members on the respective elements, said clutch members having annular inclined frictional clutch surfaces at different angles to the axis of rotation of the elements, blocks between and complementary to said surfaces, said blocks being forced against said surfaces to connect the clutch members in the shifting of the clutch members toward each other, a carrier between the surfaces for the blocks, a stop for the carrier at one edge thereof, and means operable on the opposite edge of the carrier for yieldably urging the same toward the stop.

6. In a clutch mechanism, alined driving and driven elements, a frictional clutch unit for selectively connecting said elements, said unit comprising fixed and shiftable clutch members on the respective elements, said clutch members having annular inclined clutch surfaces about said elements, blocks between and complementary to said surfaces, said blocks being forced against the surfaces to connect the clutch members on shifting the shiftable clutch member toward the fixed clutch member, and means for holding the blocks between the clutch surfaces.

7. In a clutch mechanism, alined driving and driven elements, a frictional clutch unit for selectively connecting said elements, said unit comprising fixed and shiftable clutch members on the respective elements, said clutch members having annular inclined clutch surfaces about said elements, blocks between and complementary to said surfaces, said blocks being forced against the clutch surfaces to connect the clutch members on shifting the shiftable clutch member toward the fixed clutch member, means for holding the blocks between the clutch surfaces, and means acting to center the blocks between the clutch surfaces on the shifting of the shiftable clutch member toward the fixed one.

8. In a clutch mechanism, alined driving and driven elements, a frictional clutch unit for selectively connecting said elements, said unit comprising fixed and shiftable clutch members on the respective elements, said clutch members having annular inclined clutch surfaces about said elements, blocks between and complementary to said surfaces, said blocks being forced against said surfaces to connect the clutch members on shifting the shiftable clutch member toward the fixed clutch member, a carrier between the surfaces for the blocks, and means acting on the carrier in the movement of the shiftable clutch member toward the fixed clutch member to center the carrier and the blocks with respect to the clutch surfaces.

9. In a clutch mechanism, alined driving and driven elements, a frictional clutch unit for selectively connecting said elements, said unit comprising fixed and shiftable clutch members on the respective elements, said clutch members having annular inclined clutch surfaces about said elements, blocks between and complementary to said surfaces, said blocks being forced against the clutch surfaces to connect the clutch members on shifting the shiftable clutch member toward the fixed clutch member, a carrier between the clutch surfaces for the blocks, and means on the shiftable clutch member and engageable with the carrier in the shifting of said clutch member toward the fixed one to engage the carrier to center the same and the blocks with respect to clutch surfaces.

10. In a clutch mechanism, alined driving and driven elements, a frictional clutch unit and a positive clutch unit for said elements, means for actuating said units to connect the elements first through the frictional clutch and later through the positive clutch, and means providing the frictional clutch unit with co-operating annular frictional clutch surfaces surrounding said elements and disposed at different angles to the axis of rotation thereof to afford a driving connection for the frictional clutch through the clutch surface of the lesser angle and a quick release for the frictional clutch through the clutch surface of the greater angle whereby the positive clutch unit may connect the elements on the de-clutching of the frictional clutch without an appreciable loss of synchronism between the elements as established by the frictional clutch.

11. In a clutch mechanism, alined driving and driven elements, a frictional clutch unit and a positive clutch unit for said elements, means for actuating said units to connect the elements first through the frictional clutch and later through the positive clutch, said frictional clutch unit having annular frictional clutch surfaces and an interposed means engageable with and complementary to the clutch surfaces of the frictional clutch unit, said means being forced against said clutch surfaces when connecting the frictional clutch unit, the clutch surfaces of the latter unit being disposed at different angles to the axis of rotation of the elements to afford a driving connection for the frictional clutch through the clutch surface of the lesser angle and a quick release for said clutch through the clutch surface of the greater angle whereby the positive clutch unit on the de-clutching of the frictional clutch may connect the elements without an appreciable loss of synchronism between them as established by the frictional clutch.

12. In a clutch mechanism, alined splined driving and driven elements, a frictional clutch unit and a positive clutch unit for said elements, means for actuating said units to connect the elements first through the frictional clutch and later through the positive clutch, said units having relatively shiftable clutch members on the respective elements, the positive clutch member being shiftable into bridging relation with the adjacent ends of the elements and engaging the splines thereof for connecting the elements through the positive clutch on the de-clutching of the frictional clutch, the latter having annular inclined frictional clutch surfaces about said elements and disposed at different angles to the axis of rotation thereof to afford by the lesser angle a driving connection for the frictional clutch and by the greater angle a quick release for the frictional clutch on being disengaged whereby the positive clutch member may be readily and easily engaged with the splines of the co-operating element without an appreciable loss of synchronism between the elements as established by the frictional clutch.

13. A frictional clutch unit of the character described, comprising a pair of relatively shiftable co-operating clutch members adapted for rotation about a common axis, said clutch members having frictional clutch surfaces about said axis and disposed at different angles thereto with their apices on the same side of the clutch members to afford by the surface of the lesser angle a driving connection for the clutch unit when engaged and by the surface of the greater angle a quick release for the clutch unit on being disengaged, means for establishing an operative connection between said clutch surfaces on the engagement of the unit, said means being forced into engagement with said clutch surfaces by the clutch members in the relative shifting thereof toward each other, and shifting means for said clutch members.

14. A frictional clutch unit of the character described, comprising a pair of relatively shiftable co-operating clutch members adapted for rotation about a common axis, said clutch members having frictional clutch surfaces about said axis and disposed at different angles thereto with their apices on the same side of the clutch members to afford by the surface of the lesser angle a driving connection for the clutch unit when engaged and by the surface of the greater angle a quick release for the unit on being disengaged, blocks between and engageable with said clutch surfaces, said blocks being complementary to said clutch surfaces and forced against the clutch surface of the lesser angle by the clutch surface of the greater angle in the relative shifting of the clutch members on engaging the unit, and shifting means for said clutch members.

15. A frictional clutch unit of the character described, comprising a pair of relatively shiftable co-operating clutch members adapted for rotation about a common axis, said clutch members having radially spaced inclined frictional clutch surfaces about said axis, clutching means movably mounted in the space between said inclined clutch surfaces and having frictional clutch surfaces complementary to and engageable with the inclined clutch surfaces of the clutch members, said clutching means connecting the clutch members on being clamped between the inclined clutch surfaces thereof in the relative shifting of the clutch members toward each other to close the clutch unit, and means acting on said clutching means to position the latter to be properly clamped between the clutch members.

16. In a clutch mechanism, alined driving and driven elements, a frictional clutch unit and a positive clutch unit for said elements, means for actuating said units to connect the elements first through the frictional clutch and later through the positive clutch, said frictional clutch unit having relatively shiftable clutch members on the respective elements and provided with radially spaced inclined clutch surfaces about said elements, and clutching means movably mounted in the space between said inclined clutch surfaces and having frictional clutch surfaces complementary to and engageable therewith, said clutch means connecting said clutch members on being clamped between the inclined clutch surfaces thereof in the relative shifting of the clutch members toward each other to close the frictional clutch unit, and said positive clutch unit having means co-operating with the frictional clutch members to positively connect the elements on their release by the frictional clutch members following the establishment of synchronization between the elements by the frictional clutch.

17. In a clutch mechanism, the combination of driving and driven members, connecting means therefor for selectively connecting said driving and driven members, said connecting means including means spaced from said driving and driven members, and a clutch member adapted to selectively engage and be disengaged from said driving and driven members, said member having surfaces engageable respectively with said driving and driven members, the elements forming said surfaces being unbroken straight lines, coplanar elements in different surfaces being disposed at an angle to each other, said connecting means when inoperative to connect said driving and driven members being relatively movable with respect to said driving and driven members.

18. In clutch mechanism, the combination of driving and driven members, connecting means therefor for selectively connecting said driving and driven members, said connecting means including means spaced from said driving and driven members, and a clutch member adapted to selectively engage and be disengaged from said driving and driven members, said member having surfaces engageable respectively with said driving and driven members, coplanar elements forming said surfaces being divergent and forming unbroken contact surfaces, said connecting means when inoperative to connect said driving and driven members being relatively movable with respect to said driving and driven members.

19. In clutch mechanism, the combination of driving and driven members, connecting means therefor for selectively connecting said driving and driven members, said connecting means including means spaced from said driving and driven members, and a clutch member adapted to selectively engage and be disengaged from said driving and driven members, said member having surfaces engageable respectively with said driving and driven members, the elements forming said surfaces being unbroken straight lines, coplanar elements in different surfaces being disposed at an angle to each other, said connecting means when inoperative to connect said driving and driven members being relatively movable with respect to said driving and driven members, the surfaces of said driving and driven members contacting said surfaces of said clutch member being substantially complementary and parallel thereto.

20. In clutch mechanism, the combination of driving and driven members, connecting means therefor for selectively connecting said driving and driven members, said connecting means including means spaced from said driving and driven members, and a clutch member adapted to selectively engage and be disengaged from said driving and driven members, said member having surfaces engageable respectively with said driving and driven members, coplanar elements forming said surfaces being divergent and forming unbroken contact surfaces, said connecting means when inoperative to connect said driving and driven members being relatively movable with respect to said driving and driven members, the surfaces of said driving and driven members contacting said surfaces of said clutch member being substantially complementary and parallel thereto.

21. In a clutch mechanism, driving and driven elements, a frictional clutch unit for selectively connecting said elements, said unit comprising a pair of relatively shiftable cooperating clutch members on the respective elements, said clutch members each having an annular frictional clutch surface disposed at an angle to each other, blocks between and engageable with said clutch surfaces, said blocks being forced against the clutch surfaces by the clutch members in the relative shifting thereof toward each other to connect the clutch members and having clutch faces complementary to those of the clutch members, and shifting means for said clutch members.

22. In a clutch mechanism, driving and driven elements, a frictional clutch unit for selectively connecting said elements, said unit comprising a pair of relatively shiftable cooperating clutch members on the respective elements, said clutch members each having an annular frictional clutch surface disposed at an angle to each other, blocks between and engageable with said clutch surfaces, said blocks being forced against the clutch surfaces by the clutch members in the relative shifting thereof toward each other to connect the clutch members and having clutch faces complementary to those of the clutch members, means for holding the blocks between the clutch surfaces, and shifting means for said clutch members.

23. In a clutch mechanism, driving and driven elements, a frictional clutch unit for selectively connecting said elements, said unit comprising a pair of cooperating clutch members on the respective elements, said clutch members each having an annular frictional clutch surface disposed at an angle to each other, blocks between and engageable with said clutch surfaces, said blocks being forced against the clutch surfaces when connecting the clutch members and having clutch faces complementary to those of the clutch members, said blocks being relatively movable with respect to said clutch members when in position to disconnect said clutch members.

24. In a clutch mechanism, driving and driven elements, a frictional clutch unit for selectively connecting said elements, said unit comprising a pair of cooperating clutch members on the respective elements, said clutch members each having an annular frictional clutch surface disposed at an angle to each other, blocks between and engageable with said clutch surfaces, said blocks being forced against the clutch surfaces when connecting the clutch members and having clutch faces complementary to those of the clutch members, said blocks being relatively movable with respect to said clutch members when in position to disconnect said clutch members, and means for holding the blocks between the clutch surfaces.

25. In clutch mechanism, the combination of driving and driven members, connecting means therefor for selectively connecting said driving and driven members, said connecting means including means spaced from said driving and driven members, and a clutch member adapted to selectively engage and be disengaged from said driving and driven members, said member having surfaces engageable respectively with said driving and driven members, the elements forming said surfaces being so constructed and arranged with respect to each other that they progressively engage and are disengaged from said driving and driven members when said driving and driven members are connected and disconnected, said connecting means when inoperative to connect said driving and driven members being relatively movable with respect to said driving and driven members.

26. In a clutch mechanism, the combination of cooperating clutch members adapted for rotation about a common axis, said clutch members having frictional clutch surfaces disposed at different angles, and clutching means interposed between said clutch surfaces and selectively engageable therewith for clutching and declutching said clutch members, said clutching means having frictional clutch surfaces engageable with and complementary to the clutch surfaces of the clutch members, said clutching means being forced against the clutch surfaces of the clutch members when connecting the clutch members and when inoperative to connect said clutch members being relatively movable with respect thereto.

27. In a clutch mechanism, the combination of cooperating clutch members adapted for rotation about a common axis, said clutch members having radially spaced inclined frictional clutch surfaces disposed at different angles to each other, and clutching means interposed between said inclined clutch surfaces and selectively engageable therewith for clutching and declutching said clutch members, said clutching means having frictional clutch surfaces engageable with and complementary to the clutch surfaces of the clutch members, said clutching means being forced against the clutch members and when inoperative to connect said clutch members being relatively movable with respect thereto.

LEON J. CAMPBELL.